United States Patent [19]

Gilboy

[11] Patent Number: 5,465,113
[45] Date of Patent: Nov. 7, 1995

[54] PROGRAMMABLE CHANNEL REGULATING CABLE TELEVISION CONTROLLER

[75] Inventor: Christopher P. Gilboy, Freehold, N.J.

[73] Assignee: AT&T Corp., Murray Hill, N.J.

[21] Appl. No.: 165,623

[22] Filed: Dec. 13, 1993

[51] Int. Cl.⁶ .................................................. H04N 7/00
[52] U.S. Cl. ........................ 348/5.5; 348/10; 348/906; 455/26.1
[58] Field of Search ............................. 348/5.5, 460, 473, 348/906, 5, 6, 10; 455/26.1, 3.1, 6.2; H04N 7/00, 7/08, 7/10, 5/76

[56] References Cited

U.S. PATENT DOCUMENTS

| | | | |
|---|---|---|---|
| 4,635,121 | 1/1987 | Hoffman et al. | |
| 4,706,121 | 11/1987 | Young | |
| 4,751,578 | 6/1988 | Reiter et al. | |
| 5,038,211 | 8/1991 | Hallenbeck | 348/460 |
| 5,168,372 | 12/1992 | Sweetser | 348/5.5 |

FOREIGN PATENT DOCUMENTS

| | | | |
|---|---|---|---|
| 0236591 | 11/1985 | Japan | |
| 0004801 | 3/1992 | WIPO | H04N 5/76 |

*Primary Examiner*—David E. Harvey

[57] ABSTRACT

The programmable cable controller in accordance with the invention is adapted to accept a time limit and a time period which are input by a viewer. A channel timer is provided to track the display time of the cable television channel and, upon reaching the preset time limit, display of the cable channel is blocked. The channel timer is reinitialized upon expiration of the preset time period. The programmable cable controller is also adapted to receive cable television programming listings and a viewer's programming preferences and to store them in memory. The viewer's programming preferences are applied to the cable television programming listings to produce a redacted listing of television programming which may be displayed on the television set.

9 Claims, 26 Drawing Sheets

CHANNEL TIMER

ENTER CHANNEL TIMER 1, 2, 3, 4

| TIMER | CHANNELS | LIMIT | PER | REMAINING |
|-------|----------|-------|-------|-----------|
| #1 | 6, 10 | 3 HR | DAY | 2.3 HR |
| #2 | 33 | 5 DY | MONTH | 3 DY |
| #3 | NOT SET | | | |
| #4 | NOT SET | | | |

FIG. 6A

CHANNEL TIMER

ENTER CHANNEL NUMBERS, HIT " ENTER " WHEN FINISHED

| TIMER | CHANNELS | LIMIT | PER |
|-------|----------|-------|-------|
| #1 | 6, 10 | 3 HR | DAY |
| #2 | 33 | 5 DY | MONTH |
| #3 | * | | |
| #4 | NOT SET | | |

FIG. 6B

| CHANNEL TIMER | | | |
|---|---|---|---|
| ENTER NUMERIC TIME LIMITATION | | | |
| TIMER | CHANNELS | LIMIT | PER |
| #1 | 6, 10 | 3 HR | DAY |
| #2 | 33 | 5 DY | MONTH |
| #3 | 77 | * | |
| #4 | NOT SET | | |

FIG. 6C

| CHANNEL TIMER | | | |
|---|---|---|---|
| ENTER 1 = MIN, 2 = HR, 3 = DAY, 4 = WEEK, 5 = MONTH | | | |
| TIMER | CHANNELS | LIMIT | PER |
| #1 | 6, 10 | 3 HR | DAY |
| #2 | 33 | 5 DY | MONTH |
| #3 | 77 | 8 | |
| #4 | NOT SET | | |

FIG. 6D

CHANNEL TIMER

ENTER  1 = MIN, 2 = HR, 3 = DAY, 4 = WEEK, 5 = MONTH

| TIMER | CHANNELS | LIMIT | PER |
|---|---|---|---|
| #1 | 6, 10 | 3 HR | DAY |
| #2 | 33 | 5 DY | MONTH |
| #3 | 77 | 8 HR | |
| #4 | NOT SET | | |

FIG. 6E

CHANNEL TIMER

BEGIN TIMER #3 AT:   __ : __

OR              3 = NOW

4 = MIDNIGHT

FIG. 6F

PERSONAL PROGRAMMING GUIDE
PLEASE SELECT YOUR PERSONAL PROGRAMMING GUIDE:

1. MOM
2. DAD
3. (NOT USED)
4. (NOT USED)
5. (NOT USED)
6. (NOT USED)

FIG. 13A

PERSONAL PROGRAMMING GUIDE #3

PLEASE ENTER YOUR NAME:

\_ \_ \_ \_ \_ \_ \_ \_ \_ \_ \_ \_

USE "^" / "v" BUTTONS TO SELECT LETTERS

USE " > " TO MOVE TO THE NEXT LETTER

HIT " ENTER " WHEN FINISHED

FIG. 13B

PERSONAL PROGRAMMING GUIDE (#3) FOR MATTHEW

PLEASE MAKE A SELECTION:

1. VIEW PROGRAMMING GUIDE
2. UPDATE " LIKE " LIST
3. UPDATE " DISLIKE " LIST
4. DELETE GUIDE

FIG. 13C

UPDATING MATTHEW'S " LIKE " LIST

< LIST EMPTY >

OPTIONS
1. ADD SUBJECT           4. ADD SPECIAL ITEMS
2. ADD PROGRAM NAME      5. ADD CURRENT PROGRAM
3. ADD CHANNEL NUMBER    6. DELETE ITEMS OR " EXIT "

FIG. 13D

```
              ADD SUBJECTS

0001    ADVENTURE

0002    AFRICA

0003    ANIMALS
USE "^" OR "v" KEYS TO MOVE THROUGH LIST
ENTER 4-DIGIT NUMBER TO SKIP THROUGH LIST
HIT " ENTER " TO ADD (DELETE) ITEMS
HIT " EXIT " TO EXIT
```

FIG. 13E

```
            ADD PROGRAM NAME

0001    ABC

0002    ADVENTURE QUEST

0003    ALL MY SONS

0004    AN EVENING AT THE GALLERY

0005    AT THE RACES
USE "^" OR "v" KEYS TO MOVE THROUGH LIST
ENTER 4-DIGIT NUMBER TO SKIP THROUGH LIST
HIT " ENTER " TO ADD (DELETE) ITEMS
HIT " EXIT " TO EXIT
```

FIG. 13F

ADD SPECIAL ITEMS

— — — — — — — — — — —
— — — — — — — — — — —
— — — — — — — — — — —
— — — — — — — — — — —
— — — — — — — — — — —

HIT " ENTER " TO GO TO THE NEXT LINE
HIT " EXIT " TO EXIT

FIG. 13G

UPDATING MATTHEW'S " LIKE " LIST

GOLF
" ABC "
JUDY GARLAND
COOKING
NY RAIDERS

OPTIONS
 1. ADD SUBJECT            4. ADD SPECIAL ITEMS
 2. ADD PROGRAM NAME       4. ADD CURRENT PROGRAM
 3. ADD CHANNEL NUMBER     4. DELETE ITEMS OR " EXIT "

FIG. 13H

PERSONAL PROGRAMMING GUIDE (#3) FOR MATTHEW

PLEASE MAKE A SELECTION:
1. VIEW PROGRAMMING GUIDE
2. UPDATE " LIKE " LIST
3. UPDATE " DISLIKE " LIST
4. DELETE GUIDE

FIG. 13I

UPDATING MATTHEW'S " DISLIKE " LIST

< LIST EMPTY >

OPTIONS
1. ADD SUBJECT             4. ADD SPECIAL ITEMS
2. ADD PROGRAM NAME   5. ADD CURRENT PROGRAM
3. ADD CHANNEL NUMBER 6. DELETE ITEMS OR " EXIT "

FIG. 13J

```
ADD CHANNEL NUMBER

___ THROUGH ___

ENTER 3-DIGIT CHANNEL NUMBER

HIT " ENTER " WHEN FINISHED
```

FIG. 13K

```
UPDATING MATTHEW'S " DISLIKE " LIST

CHANNEL 127
CHANNELS 250-300

OPTIONS
  1. ADD SUBJECT          4. ADD SPECIAL ITEMS
  2. ADD PROGRAM NAME     5. ADD CURRENT PROGRAM
  3. ADD CHANNEL NUMBER   6. DELETE ITEMS OR " EXIT "
```

FIG. 13L

PROGRAMMABLE CHANNEL REGULATING CABLE TELEVISION CONTROLLER

BACKGROUND OF THE INVENTION

The invention relates to controllers for cable television systems. More particularly, the invention relates to programmable controllers for cable television systems.

Cable television companies currently provide viewers 70 or more channels of programming from which to choose. Current cable television provides an hourly programming schedule over a pre-defined cable channel. This programming schedule is a passive display that contains all possible programming and allows no interaction or control by the viewer. In the near future, cable companies are planning to implement technology that may boost the number of available channels to 500 or more. As the number of channels available on cable systems grows, viewers will be overloaded with information on hundreds of possible programs to view. Additionally, as the availability of programming choices increases, the amount of viewing time expended by viewers will likely increase as well.

Recently, features have been provided in the cable controller to help reduce the amount of viewing time of undesirable programming, particularly by children. Such features are typically mechanical or electrical lockouts that either entirely prevent viewing or permit viewing only upon providing a password. However, such systems operate only by direct intervention and do not operate automatically. Thus, they only limit viewing by establishing an "on" or "off" display state for time cable channel. Further, such features do not act to limit the amount of viewing time of a particular channel.

In view of the foregoing, there is a need in the art for a cable controller that assists the viewer in limiting the selection and viewing of cable television programming.

SUMMARY OF THE INVENTION

In view of the foregoing it is an object of the invention to provide a programmable cable controller that allows a viewer to limit the total viewing time of a cable television channel during a given time period.

It is a further object of the invention to provide a programmable cable controller adapted to edit total programming Listings in accordance with viewer preferences.

The programmable cable controller in accordance with the invention is adapted to accept a time limit and a time period which are input by a viewer. A channel timer is provided to track the elapsed display time of the cable television channel and, upon reaching the present time limit, display of the cable channel is blocked. Upon a channel change, the time remaining on the channel timer for that channel is displayed on the television set. The channel timer is reset upon expiration of the preset time period. Multiple channel timers may be set to limit the display time of multiple channels and the channel timers may be password protected to prevent any unauthorized changes.

The programmable cable controller is further adapted to receive cable television programming listings and a viewer's programming preferences and to store them in memory. The viewer's programming preferences may be entered in the form of "like" and "dislike" lists which are displayed on the television set. The viewer's programming preferences are applied to the cable television programming listings to produce a redacted listing of television programming which may be displayed on the television set. Multiple viewer preferences may be applied to the television programming listings to create multiple individual redacted listings. Further, several redacted listings may be combined into an aggregate listing.

BRIEF DESCRIPTION OF THE DRAWINGS

The accompanying drawings referred to herein and constituting a part hereof, illustrate preferred embodiments of the invention and, together with the description, serve to explain the principles of the invention, wherein:

FIGS. 6A–6H are display screens produced by the channel timer feature of the cable controller;

FIGS. 13A–13M are display screens produced by operation the personal programming guide feature of the cable controller.

DETAILED DESCRIPTION OF THE INVENTION

Figure 1:
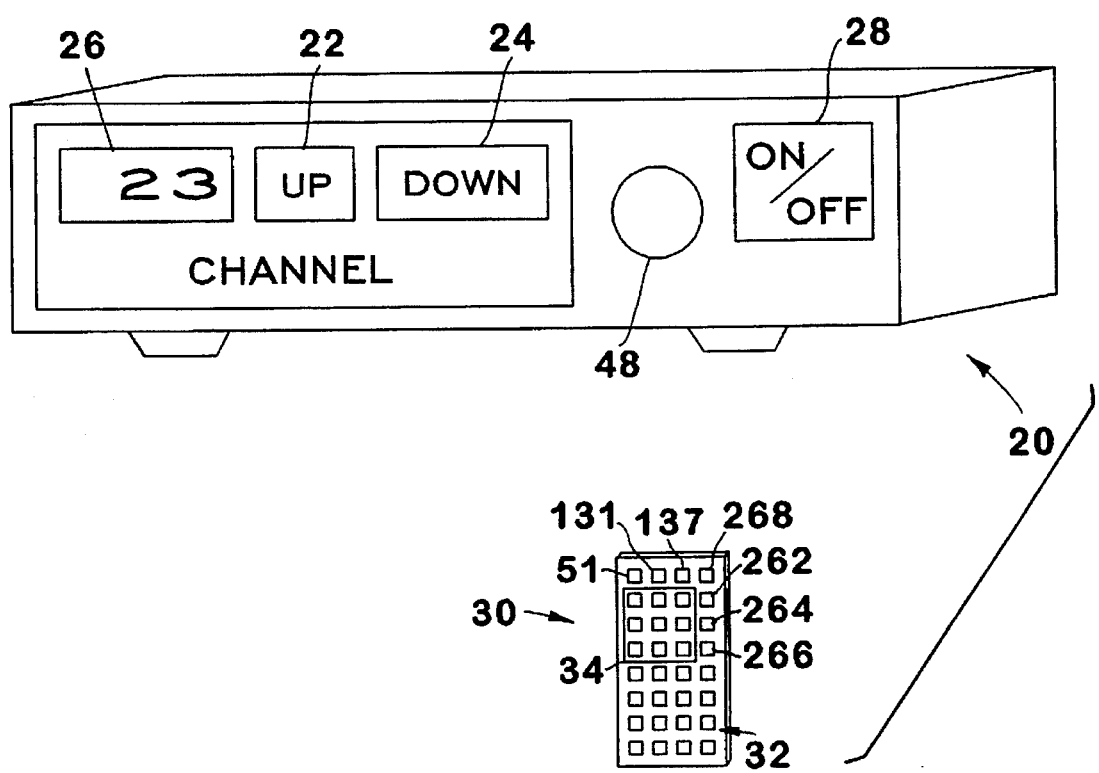
FIG. 1 is a perspective view of a cable controller and a remote control according to the invention.

A cable controller according to the invention is shown in FIG. 1. The cable controller 20 receives an input signal containing both programming and control signals from a cable company. This input signal is usually delivered over a coaxial cable that is connected to the back of the cable controller via a standard connector jack. The output from the cable controller is connected to a television set via a coaxial cable also connected in the rear of the cable controller. The output signal from the cable controller is thereby displayed on the television screen.

The cable controller 20 provides a channel selector buttons 22, 24, numeric channel indicator 26, and power button 28. A remote control 30 is also typically provided to operate the cable controller from a distance. Remote control 30 contains push buttons 32 that perform functions such as channel selection, volume mute (to turn off the sound), "flash" (to toggle between two television programs), and power on/off. The remote control has a numeric key pad 34 that can be used to directly select a specific television channel.

Figure 2:
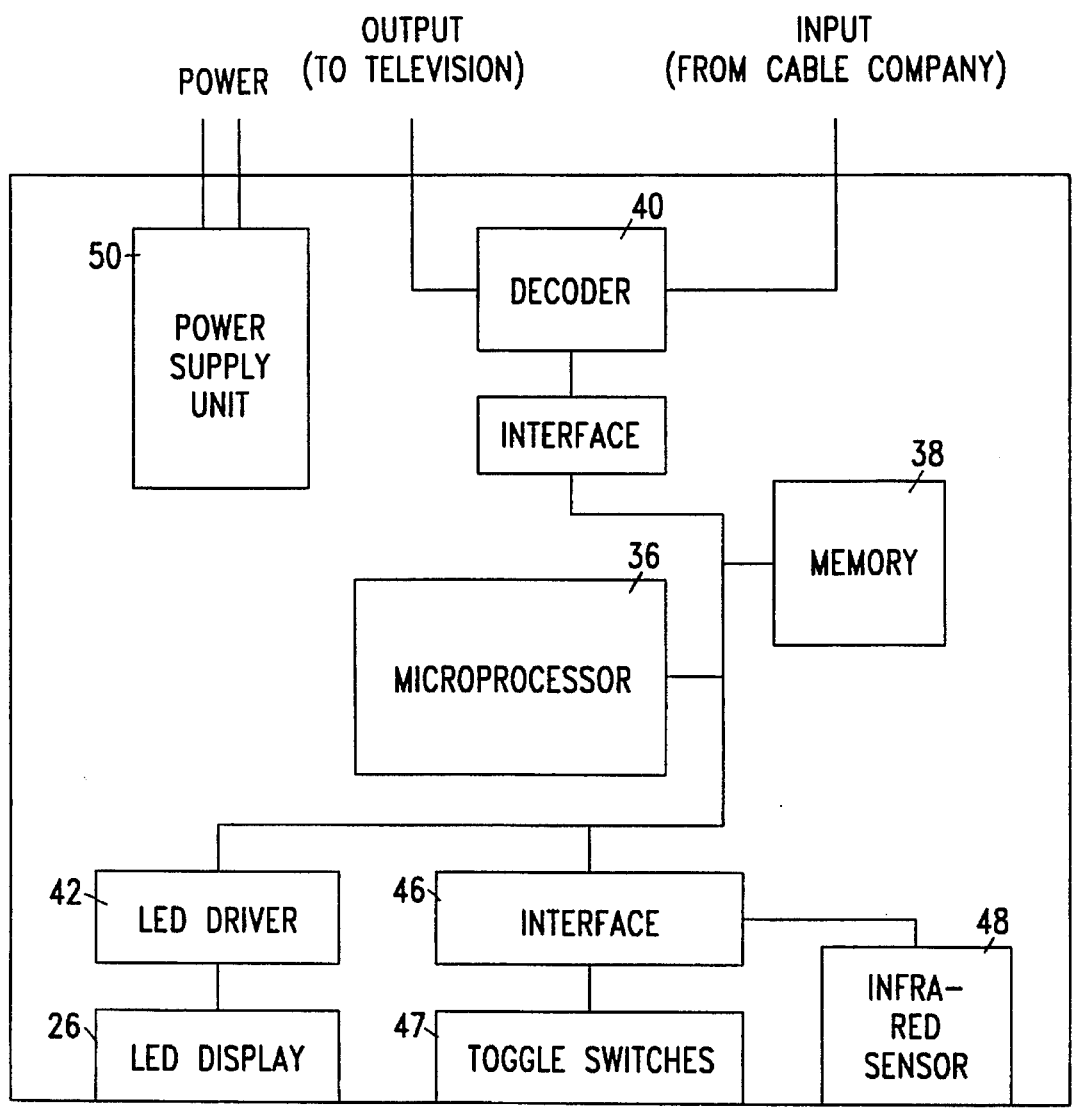
FIG. 2 is a schematic diagram of the cable controller of FIG. 1.

A schematic view of the components of the cable controller is shown in FIG. 2. The cable controller includes a microprocessor 36 and a memory 38 which stores software for execution by microprocessor 36. Decoder 40 receives the signal sent from the cable company and distinguishes between control signals and program signals. Decoder 40 is also responsible for unscrambling scrambled channels. Display Driver 42 is responsible for driving the LED (Light Emitting Diode) channel indicator 26 and is controlled by the microprocessor 36. User input interface 46 monitors the toggle switches 47, which include up and down channel selector buttons, 22, 24, and power button 28, as well as any incoming signals received by the infrared sensor 48 from the remote control unit 30. User input interface 46 sends any received signal to the microprocessor 36 so that the microprocessor can take the appropriate action. Power unit 50 receives power from a standard 110 volt AC power source and converts it to a low voltage DC power supply to power the microprocessor and other circuitry.

In accordance with the channel timer feature of the invention, a channel timer is provided which may be used to limit the amount of time that a viewer is permitted to watch a particular channel or set of channels within a give time period. A viewer-provided password is entered at the time the channel timer is set so that the channel timer cannot be later changed or turned off without authorization.

To set the channel timer, the viewer must enter the channel number(s) that are to be subjected to the timer constraint, the channel time limit, the overall frequency that the time limitation will occur, and a password. Multiple channel timers may be set.

The channel time limit and the overall frequency interval can be any period of time (e.g., minutes, hours, days, or weeks). Thus, the following examples could be created:
(a) limit viewing time for channel 1 to 3 hours per day;
(b) limit viewing time for channels 4, 33, and 97 to 200 minutes per day;
(c) limit viewing time for channel 27 to 8 hours per week; or
(d) limit viewing time for channel 88 to 5 days per month.

Multiple instances of the above examples may also be set up within given constraints. That is, multiple independent channel timers could be set with independent channels, time intervals, and overall frequency intervals. For the example discussed herein, a limit of 4 is assumed.

Figure 3A:
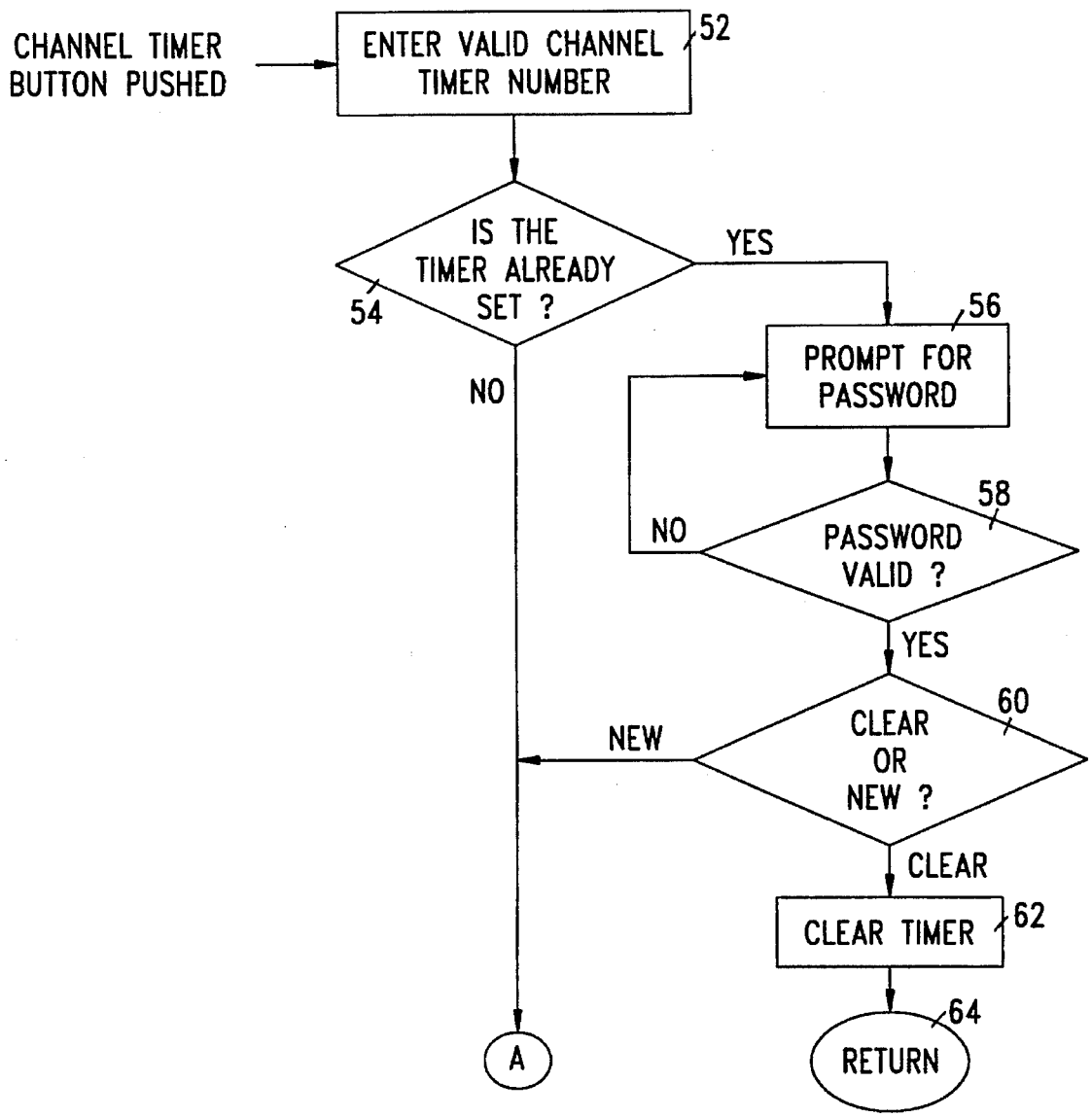
FIGS. 3A–3B are flowcharts illustrating operation of the channel timer feature of the cable controller.
Figure 3B:
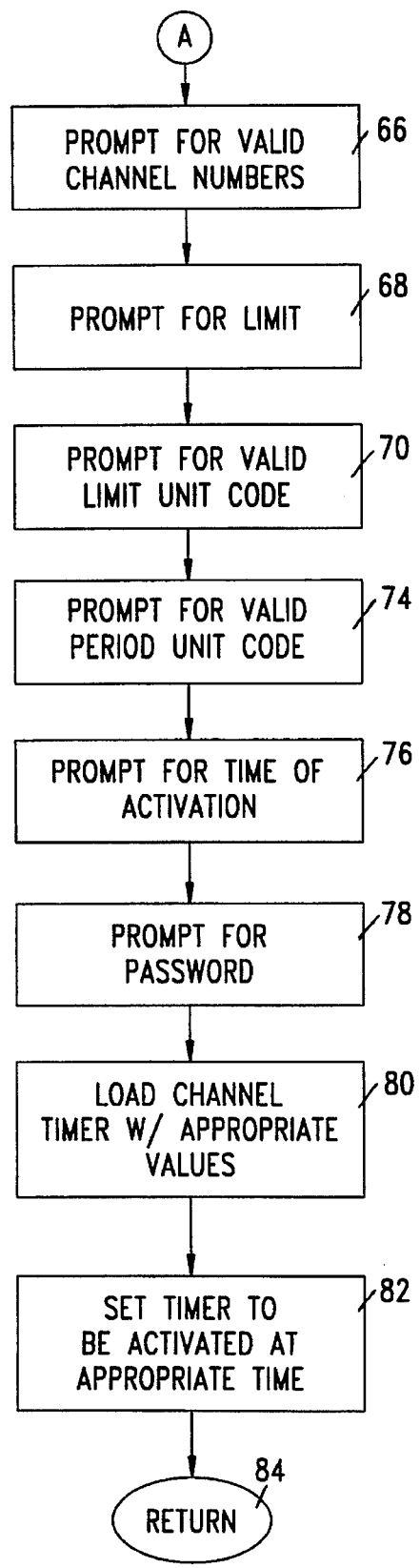

FIGS. 3A and 3B are flowcharts that illustrate operation of the cable controller allowing a person to set a channel timer limit on a channel or set of channels. Advantageously, if the channel timer is already set and active, the cable control box prompts for a password. This prevents against unauthorized changes to the channel timer. The user is then prompted for information including the channel number(s), the time limit, the unit of the time limit (hours, days, etc.), the overall time period unit, the time to activate the timer, and a password.

In particular, upon pressing the channel timer button 51, the viewer enters a valid channel timer number at step 52. At step 54, a decision is made as to whether the channel timer is already set. If yes, the cable controller proceeds to step 66. If no, the cable controller prompts for a password at step 56. At step 58, a decision is made as to whether the password is valid. If no, the cable controller returns to step 56. If yes, a decision is made at step 60 as to whether the current timer information is to be cleared or new timer information set. If new timer information is to be set, the cable controller proceeds to step 66. If current timer information is to be cleared, the cable controller clears the channel timer at step 62. The cable controller then returns at step 64.

At step 66, the cable controller prompts for valid channel numbers. A prompt is initiated for a time limit at step 68 and at step 70 a prompt is initiated for a valid time limit unit code (hours, days, etc.). At step 74, a prompt is initiated for a time period unit code. A prompt is initiated at step 76 for the time of activation and at step 78 for a password. At step 80, the channel timer is loaded with the information entered by the user. The channel timer is set as a memory location containing the total display time for the cable timer (i.e., the time limit). When the channel is viewed, the channel timer in memory may then be decremented by the elapsed time on the system clock to track how much of the allotted display time has passed. At step 82, the channel timer is set to begin at the appropriate time. The cable controller returns at step 84.

Figure 4A:
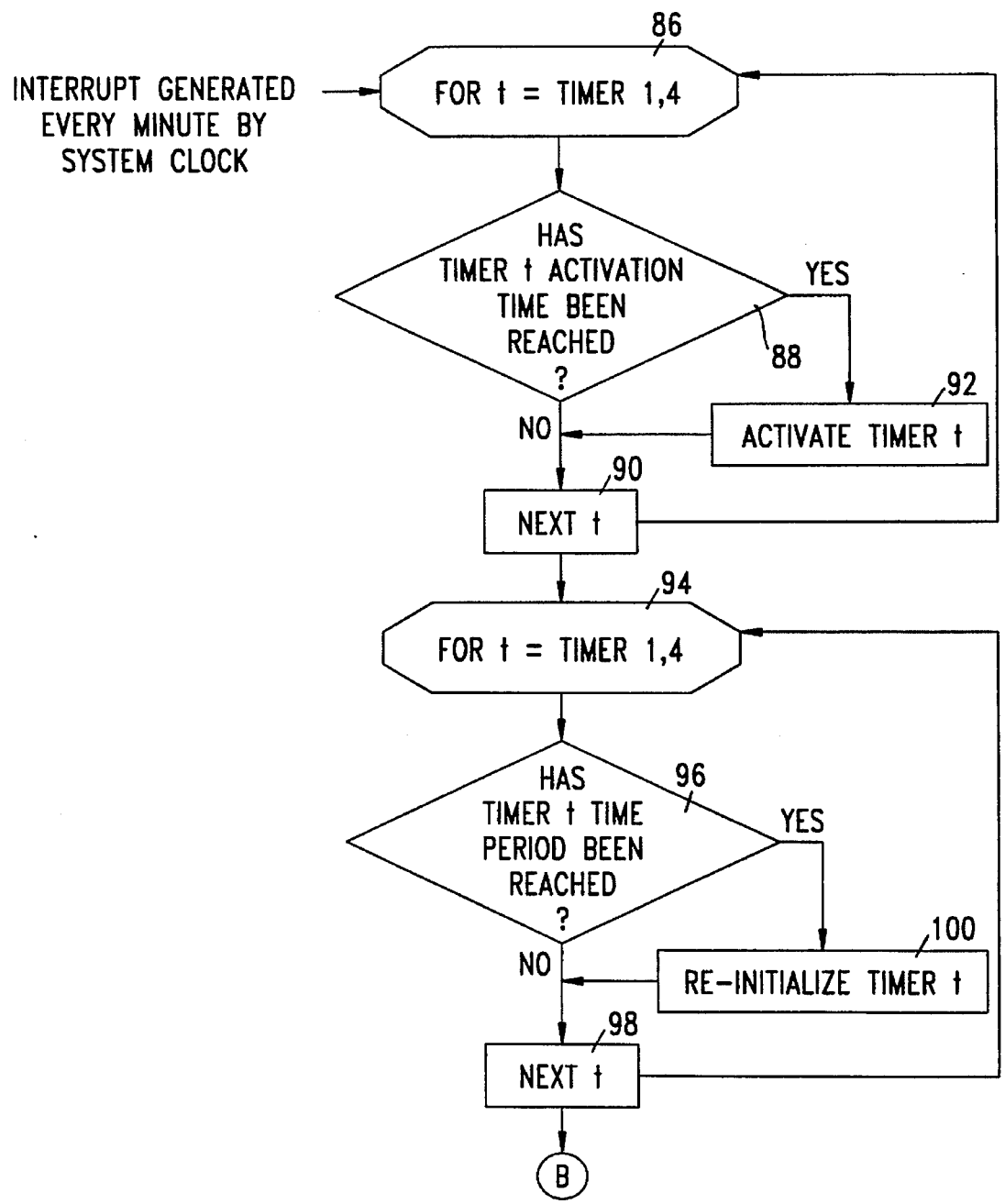
FIGS. 4A–4B are flowcharts illustrating operation of the timer limit feature of the channel timer.
Figure 4B:
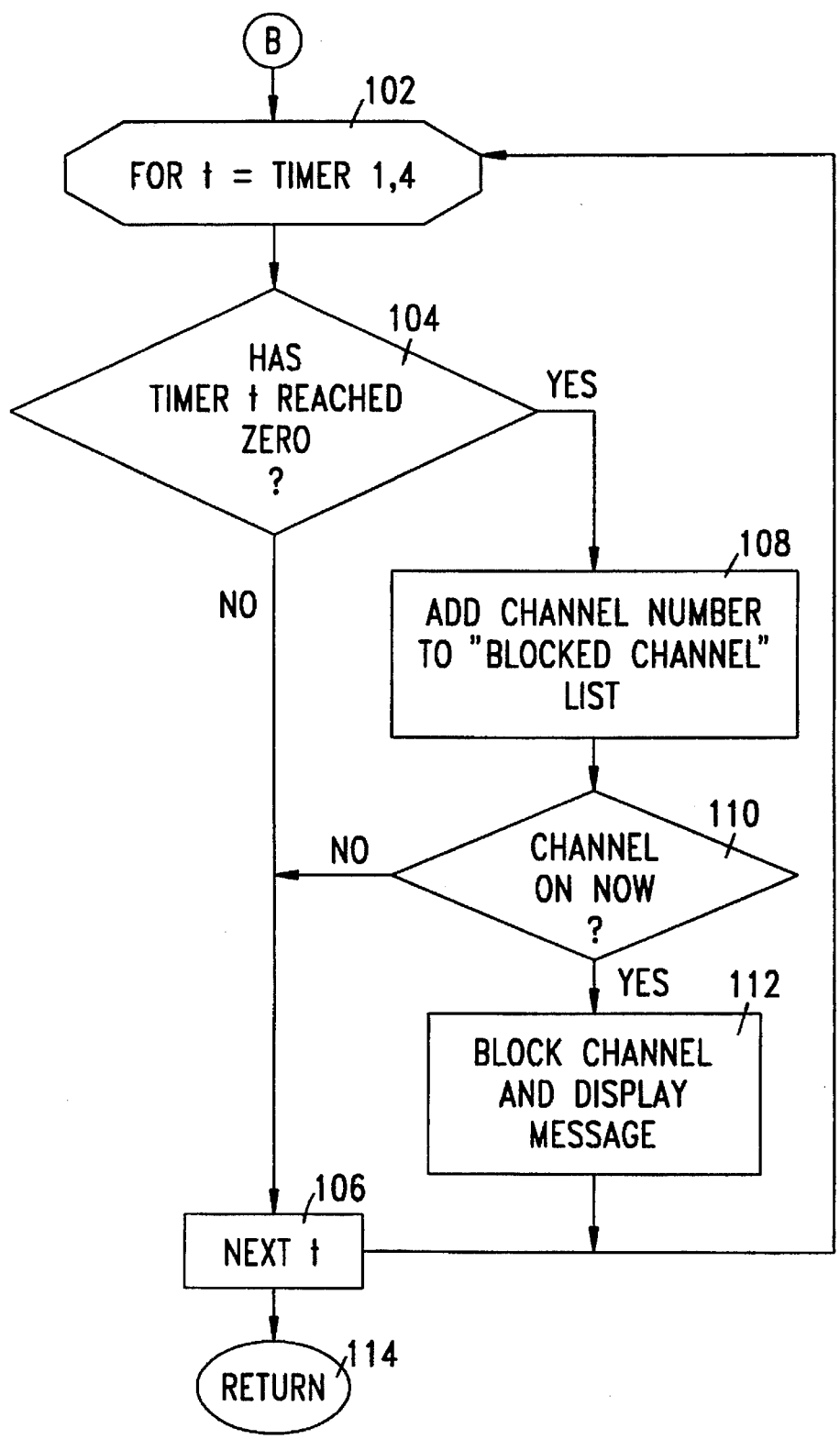

FIGS. 4A and 4B are flowcharts illustrating operation of the cable controller to monitor channel timer status. Briefly, the cable controller is called upon once a minute to check if 1) any channel timers should be activated, 2) any of the channel timers should be re-initialized to its starting value, and 3) if any channel timers have reached a zero count (and, therefore, a channel should be blocked).

In particular, an interrupt is generated by the system clock once per minute. This interrupt causes the cable controller to initiate a check of each of channel timers 1–4 at step 86. At step 88 the particular channel timer is checked to see if the activation time has been reached. If no, the next channel timer is checked per step 90. If yes, that channel timer is activated at step 92 and the next channel timer is checked per step 90.

Once all of the channel timers have been checked for activation time, at step 94 the system begins to check channel timers for time periods. At step 96, the particular channel timer is checked to determine whether its time period has been met or exceeded. If no, the next channel timer is checked per step 98. If yes, the channel timer is reinitialized by resetting the value in the appropriate memory location equal to the time limit for that channel timer at step 100 and the next channel timer is checked per step 98.

At step 102, the cable controller initiates a check of the channel timers to see if channels need to be blocked. At step 104, the particular channel timer is checked to see if its time limit has reached zero. If no, the next channel timer is checked per step 106. If yes, the channel number of that channel timer is added to the "blocked channel" list at step 108. At step 110, a decision is made as to whether the particular channel is currently in use. If no, the cable controller proceeds to check the next timer per step 106. If yes, the channel is blocked and a message indicating that the time limit was exceeded is displayed at step 112. The cable controller then proceeds to check the next channel timer per step 106. When all of the channel timers have been checked, the cable controller returns at step 114.

Figure 5:
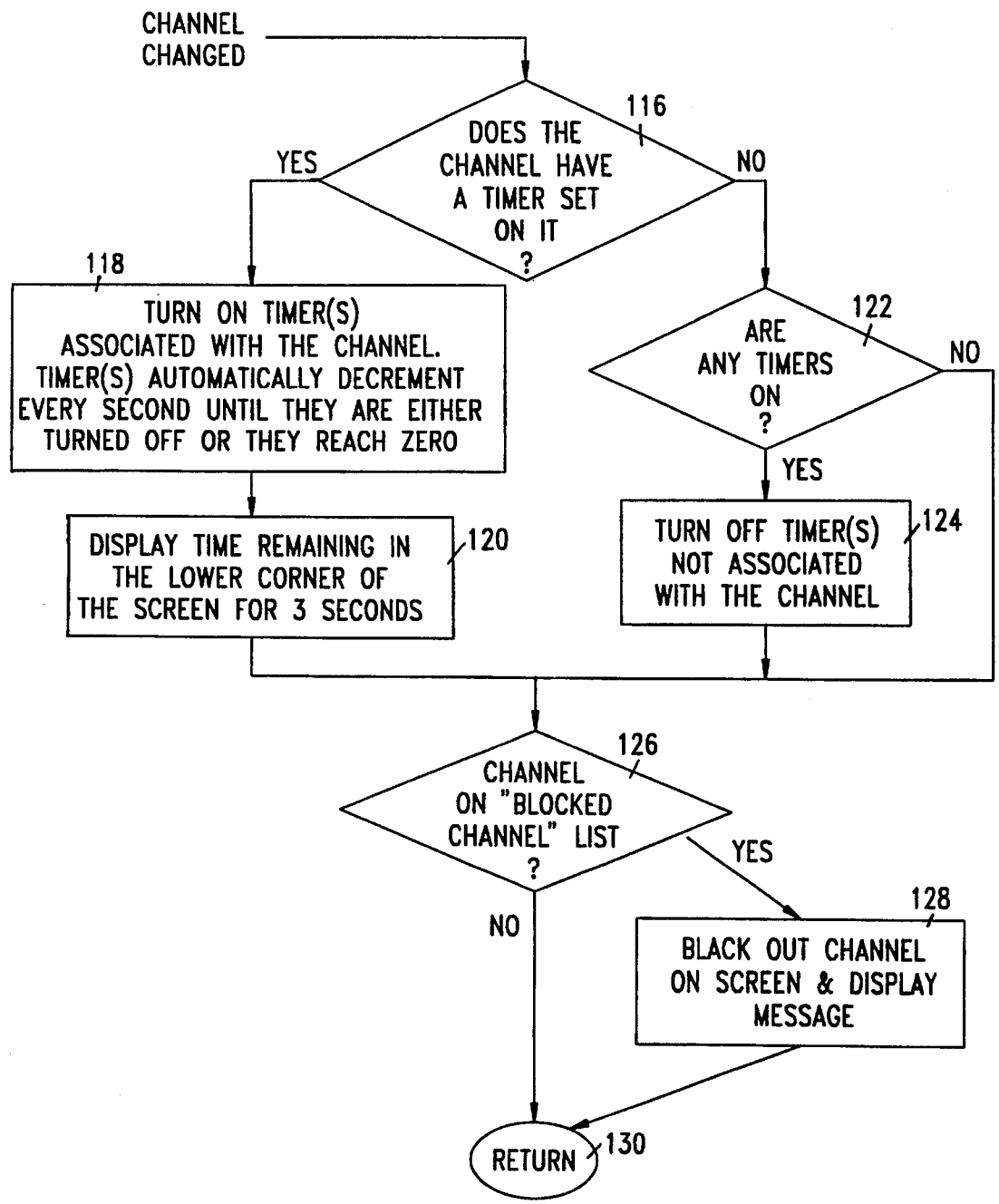
FIG. 5 is a flowchart illustrating operation of the timer decrement feature of the channel timer.

FIG. 5 is a flowchart that illustrates operation of the cable controller to decrement the channel timers when a channel is viewed and to block any channels for which the channel timer has expired.

In particular, upon a channel change a decision is made at step 116 as to whether the channel has a channel timer set for it. If yes, at step 118 the channel timer associated with the channel is turned on. The channel timer is automatically decremented every second until either the channel is turned off or the channel timer reaches zero. The time remaining on the channel timer is then displayed on a lower corner of the screen for three seconds at step 120 and the cable controller proceeds to step 126. If no, a decision is made as to whether any other channel timers are turned on at step 122. If no, the cable controller proceeds to step 126. If yes, channel timers not associated with the particular channel are turned off at step 124. At step 126, a decision is made as to whether the current channel is blocked. If yes, the television screen is blacked out and a message is displayed at step 128. If no, the cable controller returns at step 130.

To facilitate an understanding of the channel timer feature of the cable controller, an example is provided of how the channel timer could be used by a parent to control the amount of time that a child watches a certain channel. In particular, a parent wants to limit a child's viewing of a science fiction channel to 8 hours per week. The parent turns on the cable controller and pushes the channel timer button 51 on the remote control 30 to set the channel timer. Upon receiving the input, the cable controller displays the message shown in FIG. 6A on the television screen.

This display shows that channel timer #1 is set to limit channels 6 and 10 to 3 hours per day and has 2.3 hours of viewing time remaining. Channel timer #2 is set to limit channel 33 to 5 days per month and has 3 days of viewing time remaining. Channel timers #3 and #4 are not set. The parent wants to set a new channel timer (and keep the current channel timers), so the parent presses the "3" on the numeric key pad of the remote control to select channel timer #3. The cable controller then requests the information required to set up a new timer. First, the cable controller requests the channels to be limited by displaying the message shown in FIG. 6B on the television screen.

At this point, the parent reads the message and enters channel number "077", the channel number of the science fiction channel that the parent wants to limit his child's viewing of. The "*" on the screen is the cursor that indicates where the information will be added. As the "077" is entered, it appears on the screen on the channel timer #3 line. The parent presses the "enter" key 131 to signal that no more channels are to be limited. In this example, channels are entered using a fixed digit sequence of 3 digits so that a delimiter is not needed. It will be appreciated that the system could easily be modified to accept a delimiter in order to distinguish between channel numbers.

The cable controller takes this information and then requests the time limit as shown in FIG. 6C. The parent enters the number "08" to represent 8 hours. The cable controller then requests the time limit unit as shown in FIG. 6D. The parent enters the number "2" to represent hours. Next the cable controller requests the time period unit as shown in FIG. 6E. The parent enters the number "5" to represent weeks.

Next the cable controller requests the time at which the channel timer should be activated as shown in FIG. 6F. At this point the parent has the option of 1) typing a specific time (within the next 24 hours) at which the channel timer will begin, 2) begin the channel timer immediately, or 3) begin the channel timer at midnight. The parent wants the channel timer to begin at midnight so that the child knows he has eight hours each week to view the science fiction channel and that the eight hour period begins new again once a week at midnight (on the day that the channel timer is set). Therefore, the parent enters the number "4".

Figure 6G:
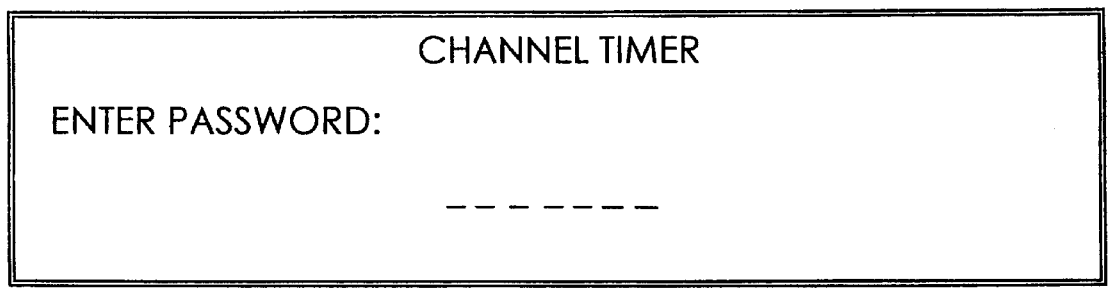

Finally, the cable controller requires that a password be entered so that only the parent can make any changes in (or remove) the channel timer. The cable controller requests the password as shown in FIG. 6G. The password must be six digits long. The parent enters "987111." At this point, the channel timer is set. Thereafter, any viewer can hit the channel timer button 51 on the remote control 30 to see how much time is remaining on each of the four channel timers.

Figure 6H:
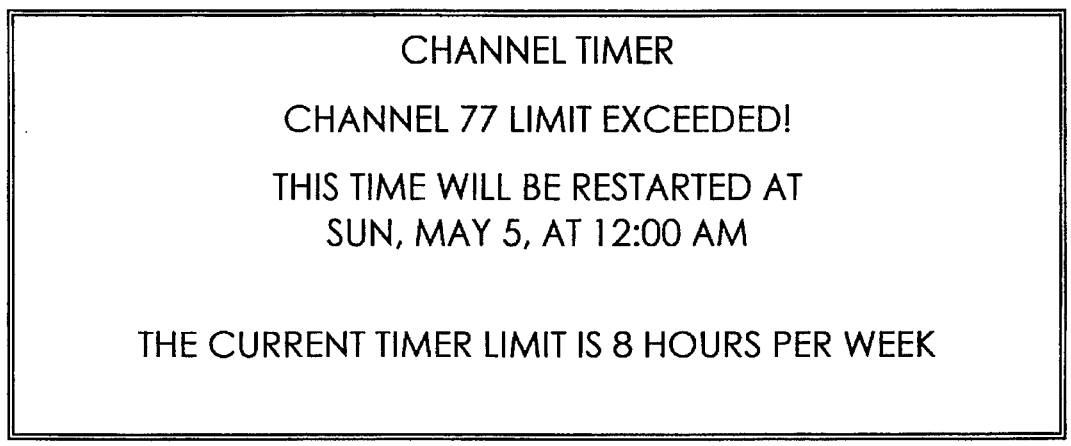

When the cable controller is tuned to the science fiction channel, a brief display in the lower right corner of the television screen indicates the time remaining on the channel timer. When the time limit is reached on the science fiction channel, the message shown in FIG. 6H is displayed when anyone tunes the cable controller to the "expired" channel.

In accordance with the personal programming guide feature of the invention, a personal programming guide is provided which allows a viewer to see a display of specific television programming that might be of particular interest. The personal programming guide is displayed on the television screen and may be controlled by the viewer.

The personal programming guide selects and displays programming that the viewer would be most interested in by comparing the entire spectrum of available programming with the viewer's likes and dislikes which are resident in a viewer profile. This viewer profile contains key words (e.g., program names, subjects, actors/actresses, sport teams) that are matched against the complete, daily television programming schedule in order to create a personalized, filtered view of upcoming television programming.

The personal programming guide can reflect changes in a viewer's likes and dislikes over time and may be turned off, if desired, so that the entire programming schedule can be viewed. Since most households contain more than one viewer, multiple personal programming guides may be provided.

Figure 7:
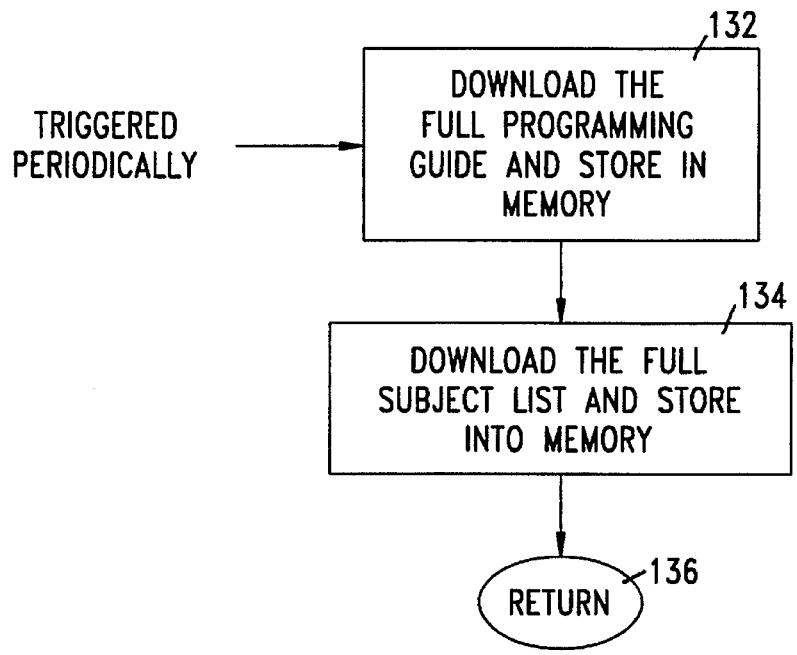
FIG. 7 is a flowchart illustrating downloading of cable television programming information to the cable controller.

FIG. 7 illustrates operation of the cable controller to maintain current programming information. The cable controller 20 downloads the full program listing for a fixed period (e.g., one week) from a source of programming information such as a cable company via control messages within the cable input signal at step 132. A pre-processed subject list, which is created by the cable company from the full program listing, is also downloaded into the cable controller at step 134. The cable controller then returns at step 136. The cable controller uses this information and applies the user-defined keyword filters ("likes" and "dislikes") to create the personal programming guide.

Figure 8:
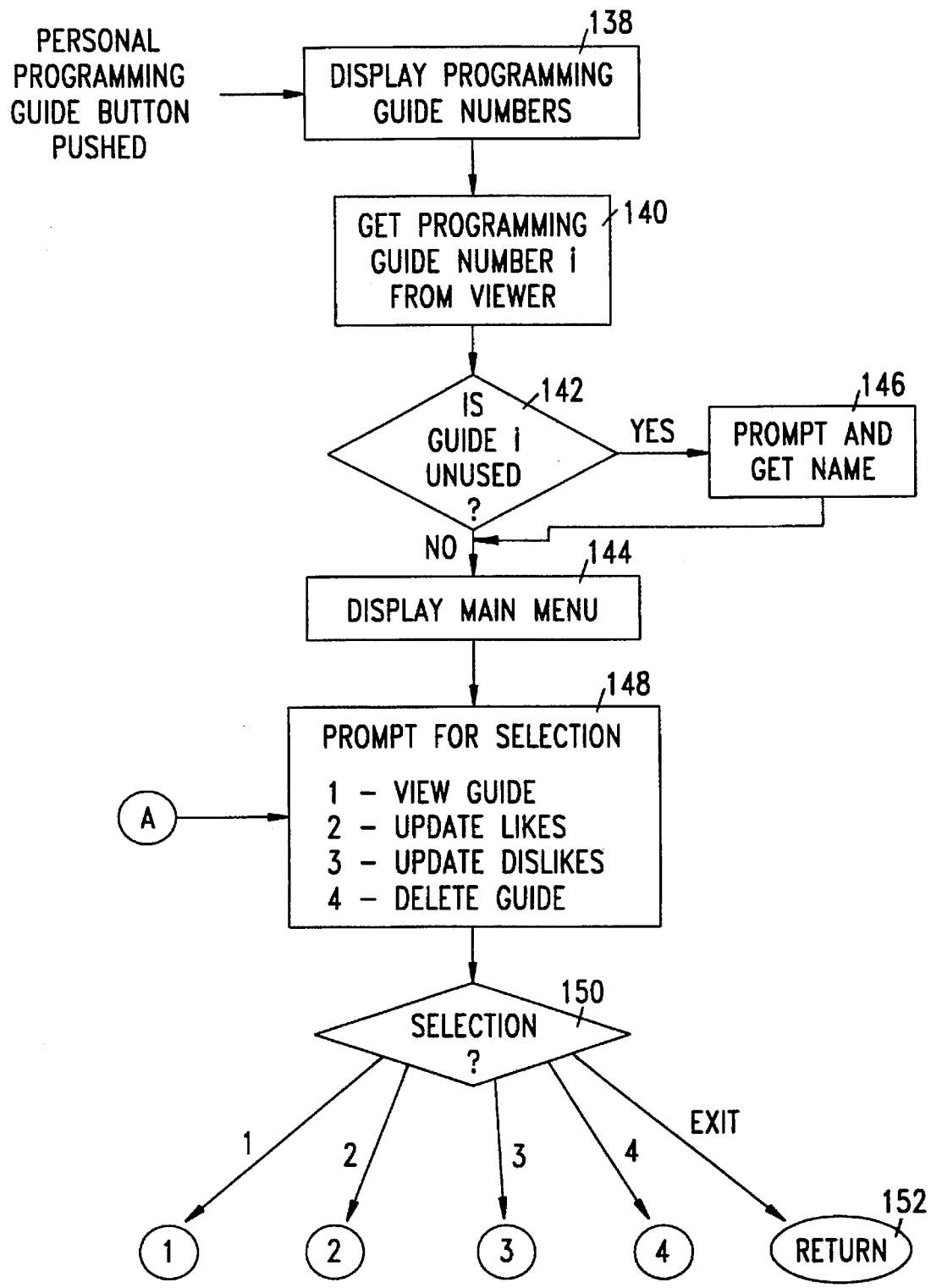
FIG. 8 is a flowchart illustrating operation of the cable controller to develop a personal programming guide.

FIG. 8 illustrates operation of the cable controller in developing a personal programming guide for a particular viewer. The personal programming guide feature displays a main menu that allows the viewer to:

1) view his personal programming guide,
2) update his personal "like" list,
3) update his personal "dislike" list, or
4) delete his guide.

The operation of the cable controller in performing the functions of options 1–4 above is shown in FIGS. 8–12.

In particular, as illustrated in FIG. 8, upon pressing the personal programming guide button, the cable controller displays the available personal programming guide numbers at step 138 and the particular personal programming guide number is obtained from the viewer at step 140. A decision is made at step 142 as to whether the particular personal programming guide number is unused. If no, the cable controller proceeds to step 144. If yes, cable controller prompts the viewer for a name for the personal programming guide at step 146. At step 144, the main menu is displayed and at step 148 a prompt is initiated for a selection from the main menu. At step 150, a decision is made as to which selection was input by the viewer and, based upon this selection, the cable controller branches to execute the desired functions 1–4 or, having selected exit, the cable controller returns at step 152.

Figure 9A:
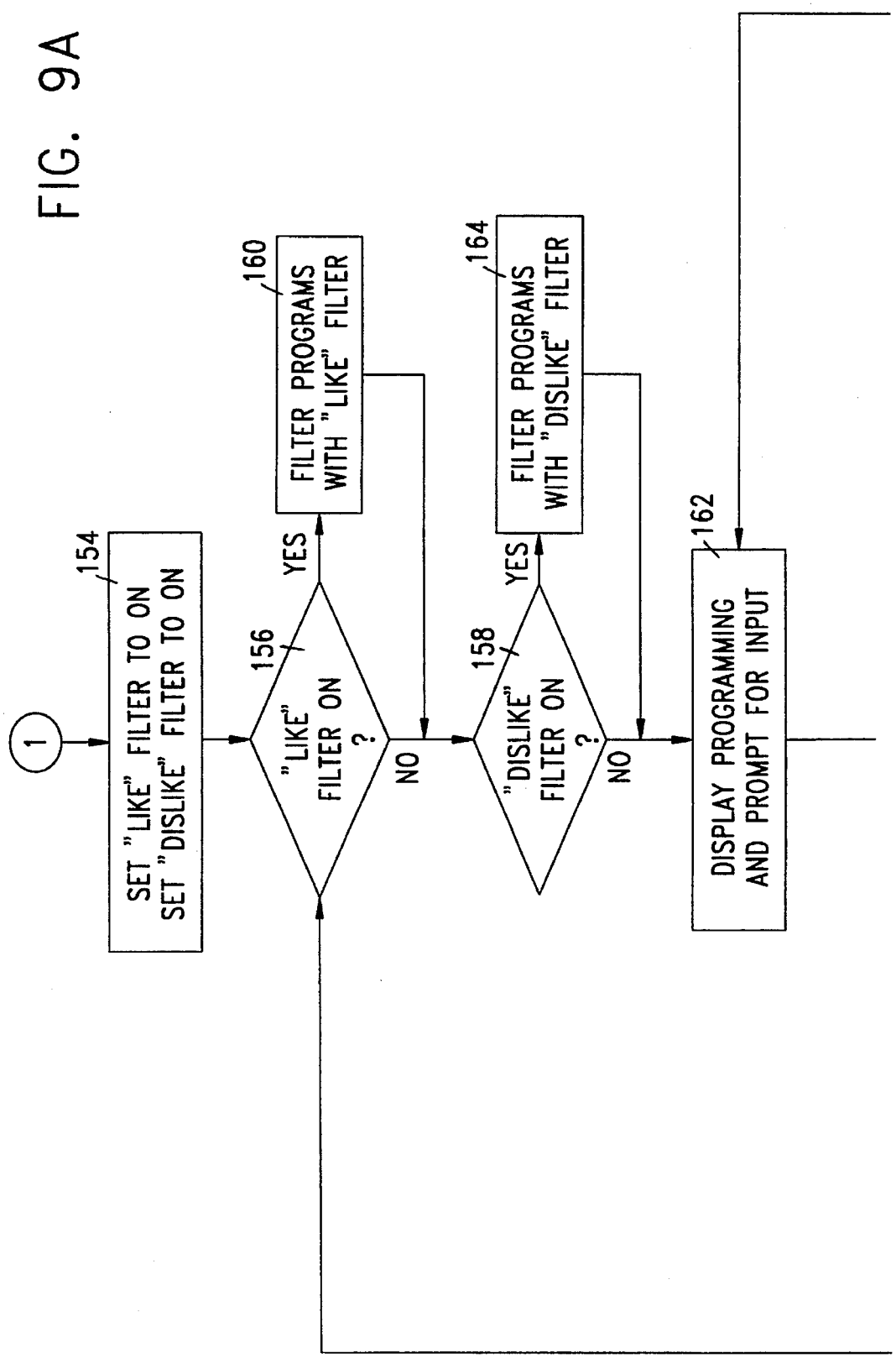
FIG. 9 is a flowchart illustrating operation of the cable controller in viewing a personal programming guide.
Figure 9B:
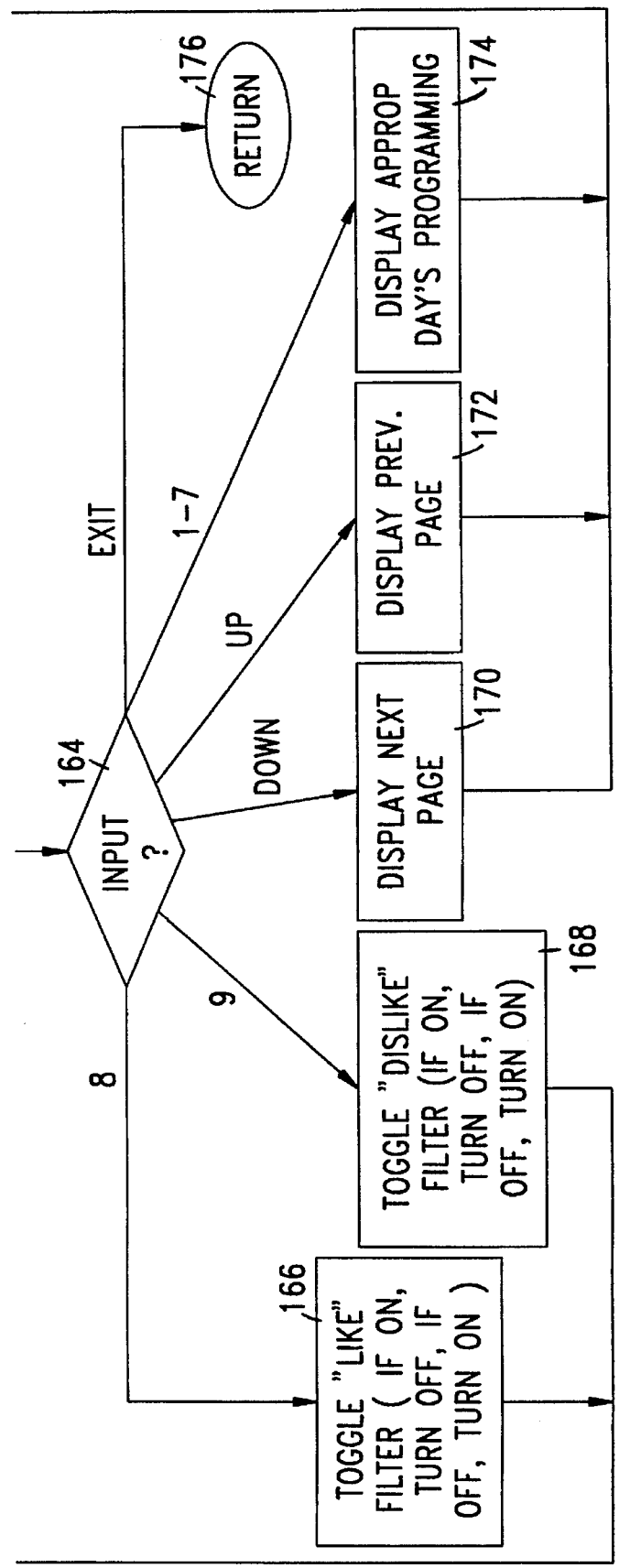

FIG. 9 illustrates operation of the cable controller allowing a viewer to see his personal programming guide. The viewer's personal programming guide is displayed on the television screen and the viewer can page through the information. The viewer can also toggle on and off both the "like" and "dislike" filters if the viewer would like to see the unredacted program listing.

In particular, having selected #1 "View Guide" from the main menu, the "like filter" and "dislike filter" are set to on at step 154. At step 156, a decision is made as to whether the "like" filter is on. If no, the cable controller proceeds to step 158. If yes, the full programming guide is filtered through the "like" filter at step 160. At step 158, a decision is made as to whether the "dislike" filter is on. If no, the cable controller proceeds to step 162. If yes, the full programming guide is filtered through the "dislike" filter at step 164. At step 162, the personal programming guide as filtered is displayed and a prompt is initiated. At step 164, a branching decision is made based upon user input. Actions may include toggling of the "like" or "dislike" filters at steps 166, 168, after which the cable controller returns to step 156. Other options include displaying the next page of programming (step 170), displaying the previous page of programming (step 172) and displaying a particular day's programming (step 174). Upon selection of exit, the cable controller returns at step 176.

Figure 10A:
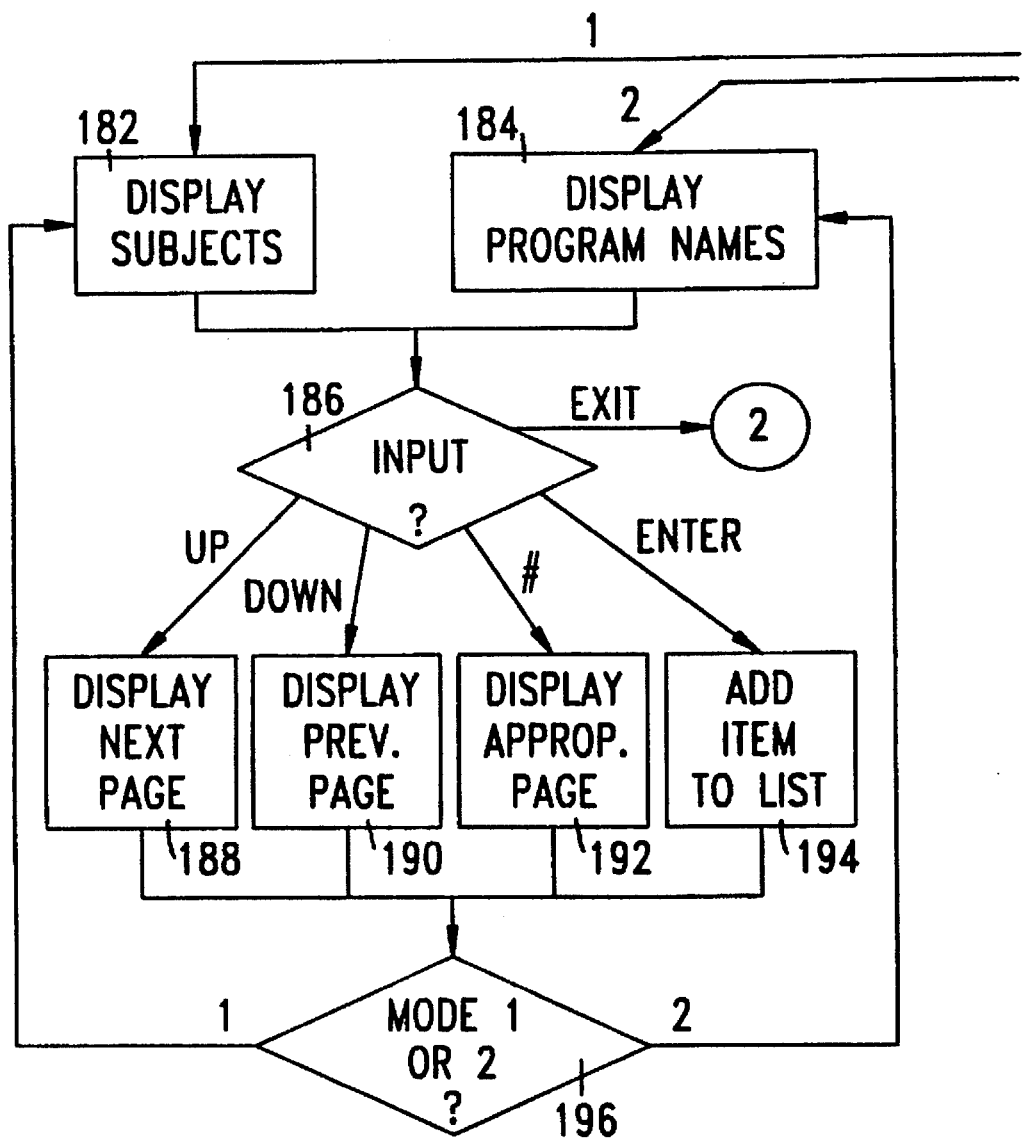
FIG. 10 is a flowchart illustrating operation of the cable controller in updating a "like" list.
Figure 10B:
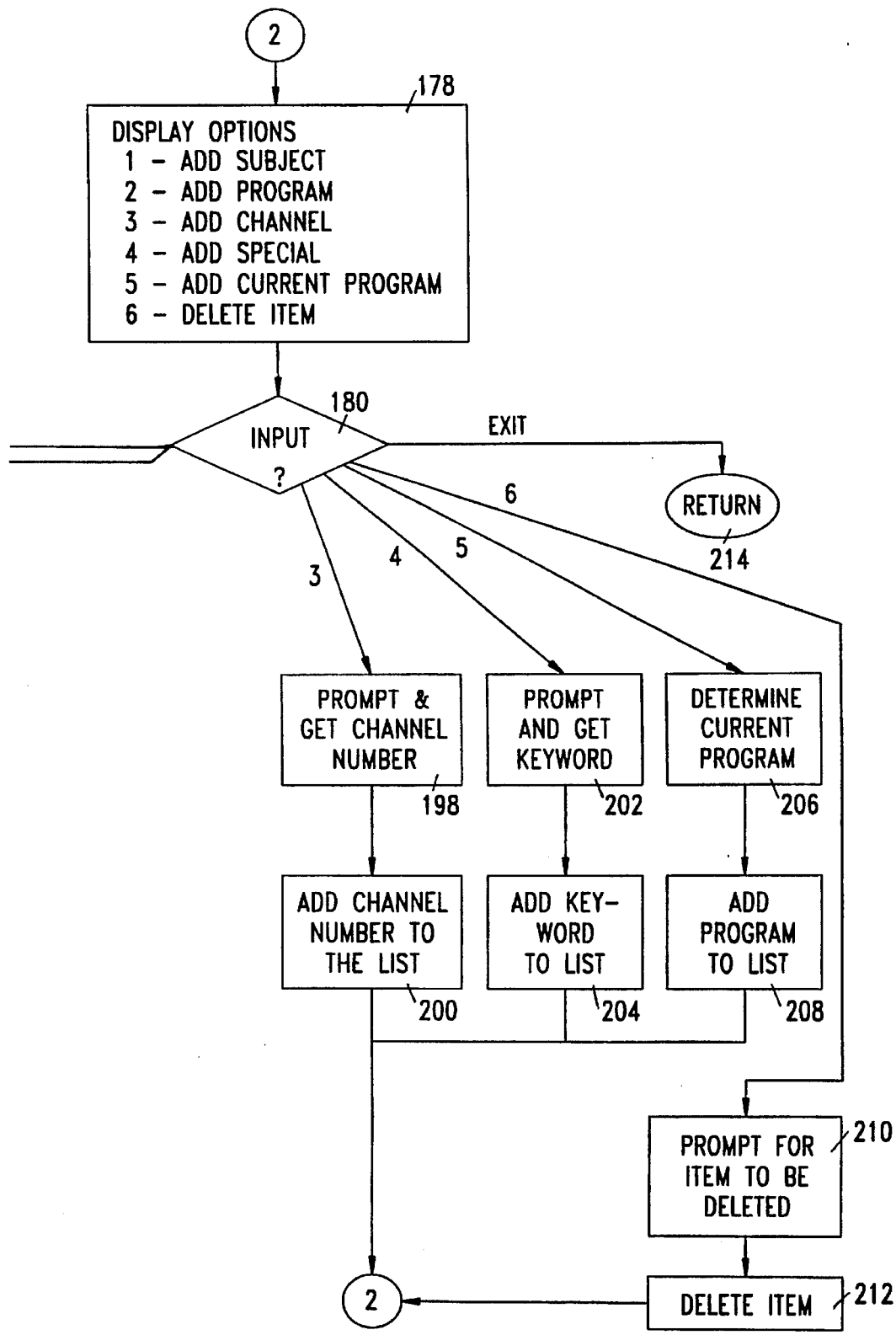

FIG. 10 illustrates operation of the cable controller allowing a viewer to update his "like" list. This feature allows a viewer to add subjects, program names, channel numbers, and keywords to the "like" list, as well as delete items from the list. Upon the selection of #2 "Update Likes" from the main menu, the cable controller displays an options menu at step 178. At step 180, a branching decision is made based upon user input. Upon selection of option #1 "Add Subject", all subjects are displayed at step 182, with subjects currently on the "like" list identified with a marker (such as an asterisk). Upon selection of #2 "Add Program" all program names are displayed at step 184, with program names currently on the "like" list identified with a marker. At step 186, the cable controller again branches based upon viewer input to either display the next page of information at step 188, display the previous page of information at step 190, display a particular page of information at step 192, or add an item to the current list at step 194. Thereafter, depending upon whether the cable controller is in subject mode (#1 selected) or program name mode (#2 selected), at step 196 the cable controller returns to either step 182 or step 184. Upon selection of exit at step 186, the cable controller returns to step 178.

If at step 180 #3 "Add Channel" is selected, a prompt is initiated and the channel number obtained from the user at step 198. At step 200 the channel number is added to the "like" list and the cable controller returns to step 178.

If #4 "Add Special" is selected at step 180, a prompt is initiated and a keyword obtained from the viewer at step 202. The keyword is added to the "like" list at step 204 and the cable controller returns to step 178.

If #5 "Add Current program" is selected at step 180, a determination is made at step 206 as to the current program and the program name is added to the "like" list at step 208. The cable controller then returns to step 178.

If #6 "Delete Item" is selected at step 180, the entire "like" list is displayed and the viewer is prompted at step 210 for the item to be deleted. The item is deleted from the "like" list at step 212 and cable controller returns to step 178. Upon selection of exit at step 180, the cable controller returns at step 214.

Figure 11A:
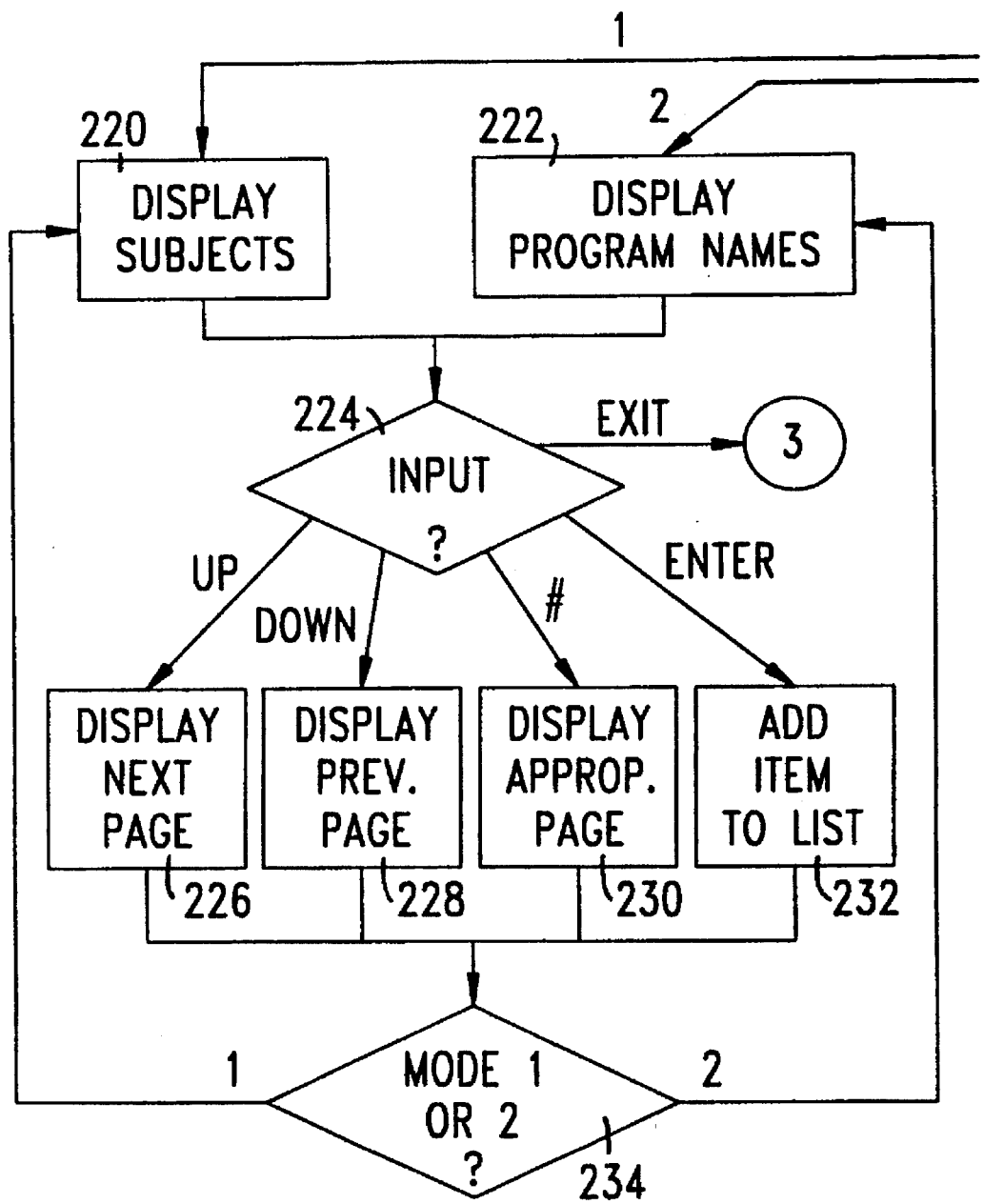
FIG. 11 is a flowchart illustrating operation of the cable controller in updating a "dislike" list.
Figure 11B:
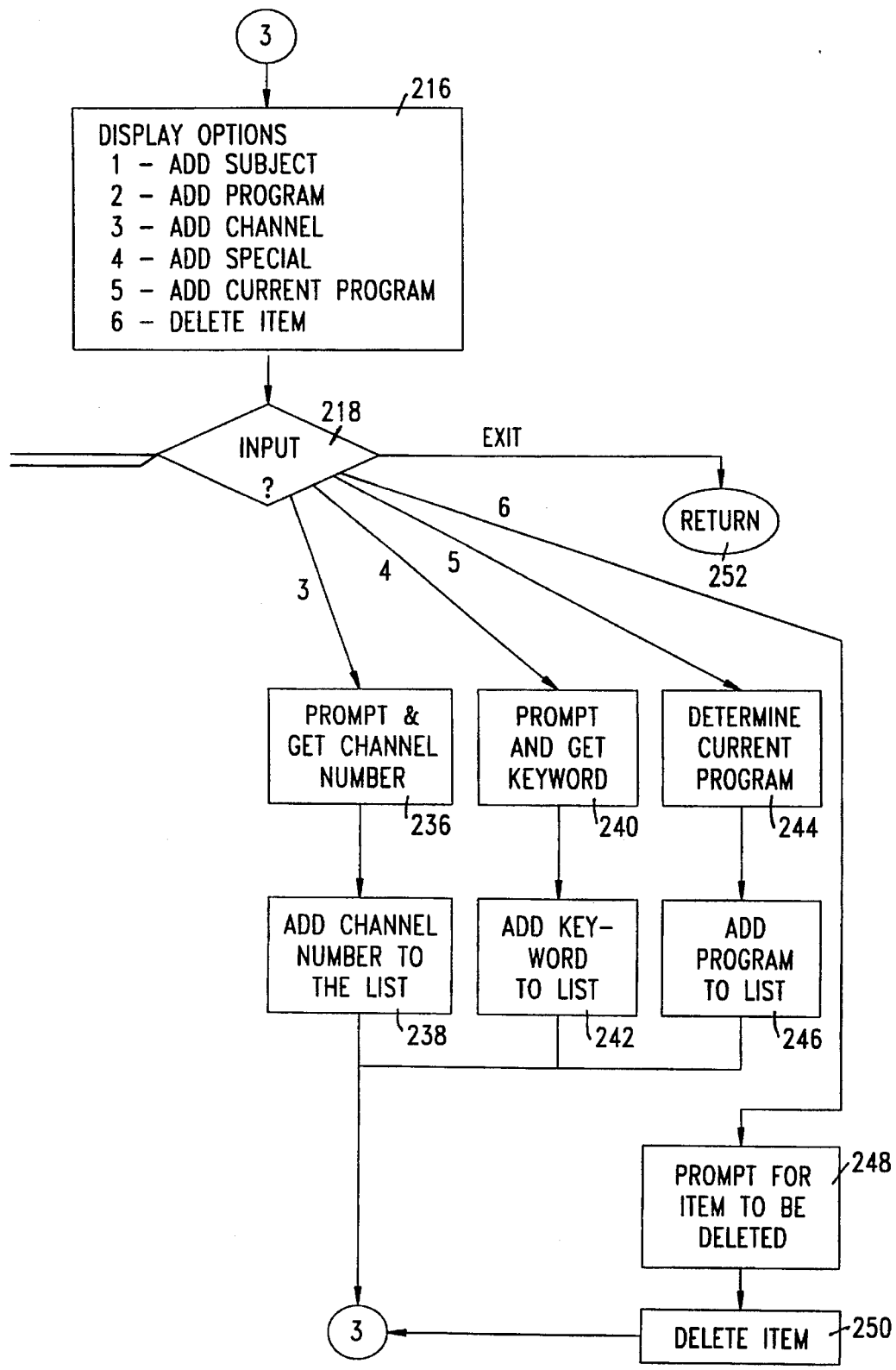

FIG. 11 illustrates operation of the cable controller to allow a viewer to update his "dislike" list. This procedure is similar to the procedure used to update the "like" list. The "dislike" list, however, is maintained as a separate and distinct list from the "like" list.

In particular, upon the selection of #3 "Update Dislikes" from the main menu, the cable controller displays an options menu at step 216. At step 218, a branching decision is made based upon viewer input. Upon selection of #1 "Add Subject", all subjects in the "dislike" list are displayed at step 220, with subjects currently on the "dislike" list identified with a marker Upon selection of #2 "Add Program" all program names in the "dislike list" are displayed at step 222, with program names currently on the "dislike" list identified with a marker. At step 224, the cable controller again branches based upon viewer input to either display the next page of information at step 226, display the previous page of information at step 228, display a particular page of information at step 230, or add an item to the current list at step 232. Thereafter, depending upon whether the cable controller is in subject mode (#1 selected) or program name mode (#2 selected), at step 234 the cable controller returns to either step 220 or step 222. Upon selection of exit at step 224, the cable controller returns step 216.

If at step 218 #3 "Add Channel" is selected, a prompt is initiated and channel number obtained from the viewer at step 236. At step 238 the channel number is added to the "dislike" list and the cable controller returns to step 216.

If #4 "Add Special" is selected at step 218, a prompt is initiated and keyword obtained from the viewer at step 240. The keyword is added to the "dislike" list at step 240 and the cable controller returns to step 216.

If #5 "Add Current Program" is selected at step 218, a determination is made at step 224 as to the current program and the program name is added to the "dislike" list at step 246. The cable controller then returns to step 216.

If #6 "Delete Item" is selected at step 218, the entire "dislike" list is displayed and the viewer is prompted at step 248 for the item to be deleted. The item is deleted from the "dislike" list at step 250 and cable controller returns to step 216. Upon selection of exit at step 218, the cable controller returns at step 252.

Figure 12:
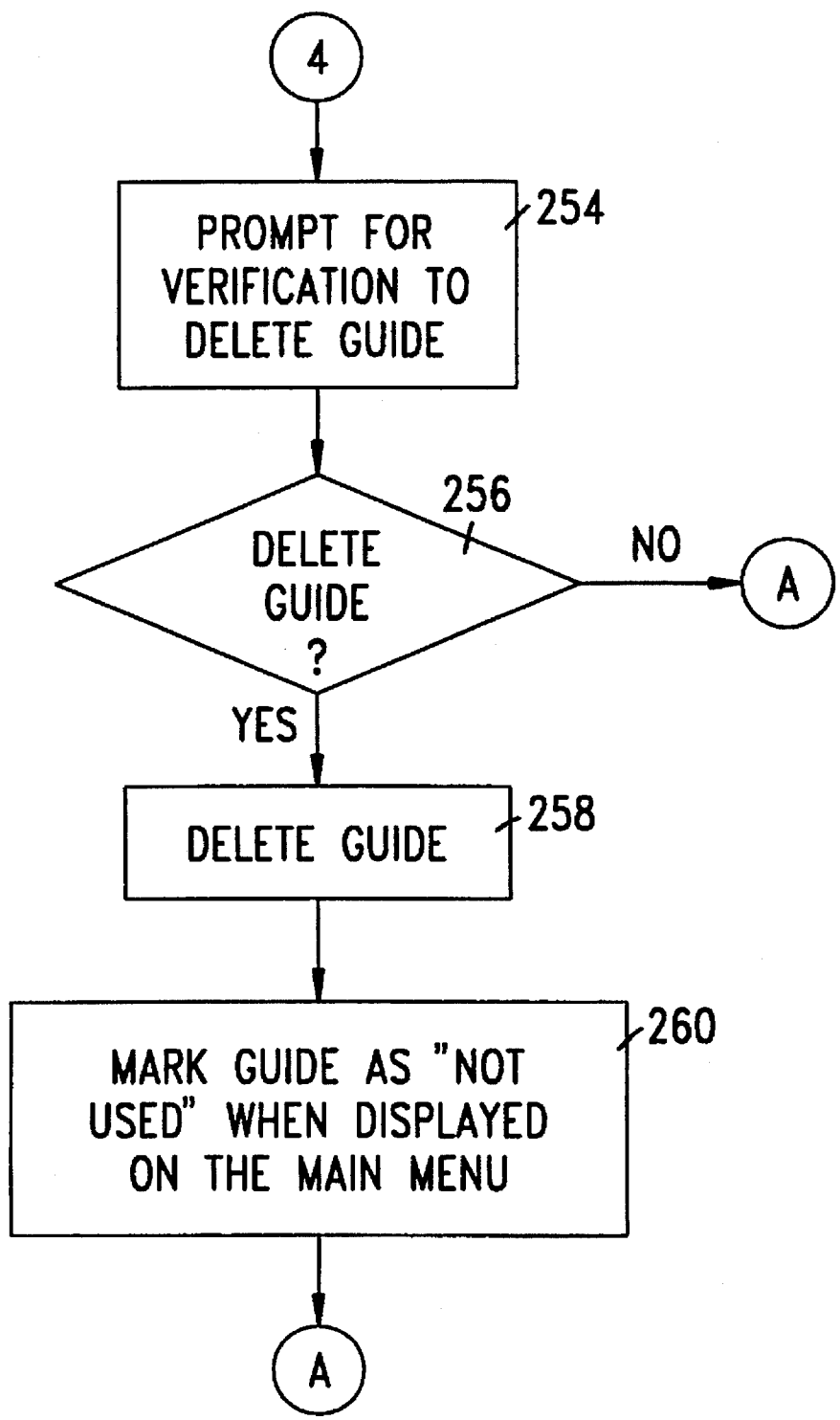
FIG. 12 is a flowchart illustrating operation of the cable controller in deletion of a personal programming guide.

FIG. 12 illustrates operation of the cable controller allowing a viewer to delete his personal programming guide. As a precaution, the viewer is given an "Are You Sure? " message before the indicated personal programming guide is deleted by the cable controller.

In particular, if #4 "Delete Guide" is selected from the main menu, the cable controller proceeds to step 254 where a prompt is initiated for confirmation to delete the personal programming guide. A decision is made at step 256 as to whether the personal programming guide is to be deleted. If no, the cable controller returns to step 148. If yes, the personal programming guide is deleted at step 258 and marked at step 260 to be indicated as "not used" when displayed on the main menu. The cable controller then returns to step 148.

The following example is provided to illustrate how the personal programming guide feature can be set up and used. A particular viewer wants to have a personal programming guide set reflect to his interests, which include golf, the television show "ABC", old Judy Garland movies, cooking, and the NY Raiders baseball team. The viewer also is not interested in the programming on the "tele-shopping" network (channel 127) and does not subscribe to the specialty pay channels 250 through 300.

To set a viewer profile up, the viewer presses the personal program guide button 137 on the remote control 30. The information shown in FIG. 13A is displayed on the television screen. The screen shows that personal programming guide #1 is used by "Mom" and personal programming guide #2 is used by "Dad". The remaining programming guides are not currently used. To create a new personal programming guide, the viewer presses the "3" button on the remote control.

To set up a new programming guide, the cable controller prompts for the viewer's name. It will be appreciated that this information is only required when a new personal programming guide is created. The message shown in FIG. 13B is then displayed on the television screen.

To enter the viewer's name, the viewer uses the up button ("^") 262 on the remote control to sequence through the alphabet to get to the desired first letter (or the down button ("v") 264 to sequence in reverse order). When the viewer reaches the desired first letter, he presses the right button (">") 266 to move the next letter. This process is repeated until the viewer has fully entered his name. In this example, the viewer enters the name "Matthew." When all letters are entered, the viewer presses the "enter" key 131 to continue. At this point, the main menu for the personal programming guide is displayed as shown in FIG. 13C.

In order to have the personal programming guide filter through all existing programming, a "like" list (and/or a "dislike" list) must be set up. The viewer enters "2" to set up the "like" list. The display shown in FIG. 13D then appears on the television screen.

The display shows that there are currently no entries in the "like" list. The bottom of the display gives the viewer the following options:

1. Add subject—This option allows the viewer add a subject keyword (e.g., golf, cooking, football, news, drama, mystery) to the "like" list.
2. Add program name—This option allows the viewer enter a program name (e.g., "ABC", "Good Morning Secaucus", "Arizona Yachting") to the "like" list.
3. Add channel number—This option allows the viewer enter a particular channel number (e.g., 17, 136, 292) to the "like" list.
4. Add special items—This option allows the viewer enter specific names (e.g., NY Raiders, Judy Garland, John Wayne, Africa) to the "like" list. This category may include items that can be entered under options 1 and 2 as well.
5. Add current program—This option allows the viewer to add the current program to which the cable controller is tuned to the "like" list.

To set up the viewer's "like" list, the viewer presses the "1" button so that he can enter the subjects "golf" and "cooking" into the "like" list. To prompt the viewer for the desired subjects, the screen shown in FIG. 13E is displayed on the television.

To enter "golf", the viewer uses the up arrow key ("^") 262 to sequence through the alphabetized list provided by the cable company to find the world "golf." To accelerate this search, the viewer can enter a 4-digit number to jump around in the list (e.g., entering "500" puts you half way through a list that is 1000 items long). When the word "golf" is found, the viewer presses the "enter" key 131 and the word is automatically entered into the "like" list. An "*" appears after the subject name to indicate that this subject is now on the "like" list. The keyword "cooking" is found in the same manner. After both keywords are found and entered, the viewer presses the "exit" key 268 to return to the "Updating Like List" menu.

Since this arrangement allows a viewer to scan through many pre-defined subjects, the user is able to enter as many subjects as desired. The pre-defined subject list is created from the actual television programming schedule by the cable company so that the subjects are relevant to television programming. If the viewer wants to add a subject that is not on this pre-defined list, then the view uses the option "Add Special Items".

To add specific programs to the "like" list, the viewer presses "2" on the remote control. The viewer is then prompted for the program name using the same method as described for entering a subject. That is, the screen shown in FIG. 13F is displayed on the television.

To enter "ABC", the viewer uses the up arrow key ("^") 262 to sequence through the alphabetized list to find the program name. Again, to accelerate this search, the viewer can enter a 4-digit number to jump around in the list. When the program "ABC" is found, the viewer presses the "enter" key 131 and the program name is automatically entered into the "like" list. An "*" appears after the program name to indicate that this program is now on the "like" list. The viewer presses the "exit" key 268 to return to the "Updating Like List" menu.

Again, since this feature allows a viewer to scan through many pre-defined programs, the user is able to enter as many program names as desired. The pre-defined program list is created by the cable company from the actual television programming schedule. If the viewer wants to add a program name that is not on this pre-defined list, then the user may use the option "Add Special Items".

Since the viewer in this example does not have any channels to add to the "like" list, option #3 "Add Channel Number" is not used.

To add special keywords to the "like" list, the viewer presses "5" on the remote control. The viewer is then prompted for the keyword by the screen shown in FIG. 13G which is displayed on the television.

To enter "NY Raiders" the viewer uses the up arrow ("^") 262 and down arrow ("v") 264 keys to sequence through the alphabet and create names as previously described. The viewer uses the same method to enter the keyword "Judy Garland." After both keywords are entered, the viewer presses the "exit" key 268 and the "Updating Personal Programming Guide" menu is displayed.

At this point the "like" list contains the items stated in this example: golf, the television show "ABC", Judy Garland, cooking and the NY Raiders. The television displays this information as shown in FIG. 13H.

One option that was not used in this example is #5, "Add Current Program." This option is a quick way for the viewer to add to the "like" list the television program to which the cable controller is currently tuned.

To exit from the "Updating Like List" menu, the viewer presses the "exit" key 268. The personal programming guide main menu appears as shown in FIG. 13I.

At this point, the viewer can create a "dislike" list using the same method that was used to create the "like" list. Since the viewer wants to add particular channels to the "dislike" list, the viewer presses "3" on the remote control. The information is displayed on the television screen as shown in FIG. 13J.

To add channels to the "dislike" list, the viewer presses "3" on the remote control. The viewer is then prompted for the channel number with the prompt shown in FIG. 13K. To add the "tele-shopping" channel to the "dislike" list, the viewer enters the channel number "127," presses "enter" and is returned to the "Updating Dislike List" menu. To add the block of pay channels (250 through 300) to the "dislike" list, the viewer presses "3" to add channel numbers to the "dislike" list and enters "250," "300" and "enter". The "Updating Dislike List" menu is redisplayed as as shown in FIG. 13L.

Figure 13M:
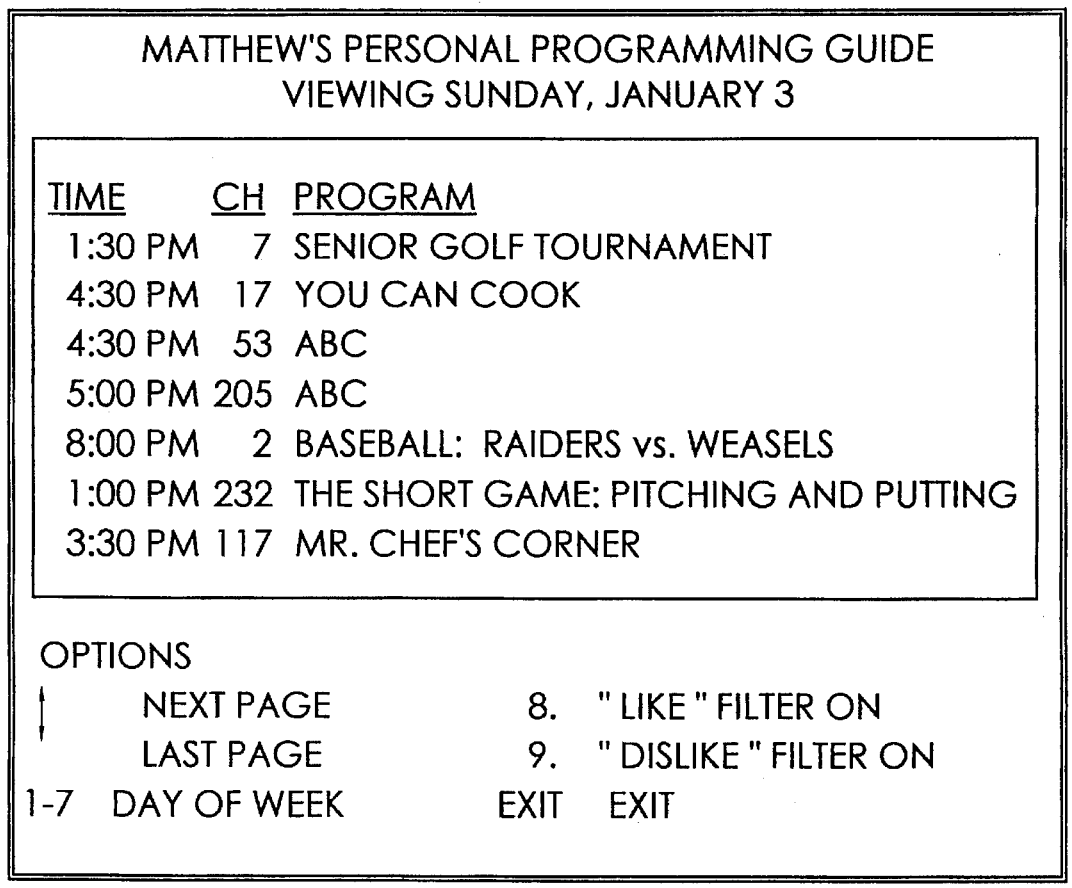

To see the viewer's personal programming guide as edited, the viewer may then press "1" and the screen shown in FIG. 13M is displayed on the television screen. The screen of FIG. 13M displays the viewers personal programming guide with the "like" and "dislike" filters applied for the current day's programming. The viewer can use the up arrow ("^") 262 and down arrow ("v") 264 keys to page through multiple information screens. In the example shown, the entire day fits onto one screen. Using the up/down arrow keys would then allow the viewer to page into the next/previous day's programming view. To jump to a specific day, the viewer can enter the day number (e.g., the viewer could hit "1" for Sunday, "2" for Monday, etc.).

It will be appreciated that all of the programs displayed in the above personal programming guide match the "like" list and do not match the "dislike" list. However, some items in the "like" list may not generate "hits" (i.e., they did not produce any matches in the current programming). In this example, no matches were found matching the keyword "Judy Garland."

The "like" and "dislike" filters can be toggled on and off. For example, if the viewer is not interested in any of the programming derived using the "like" filter, the viewer could press "8" and turn off the "like" filter. At that point, the programming guide would display all television programming except for any programs that are filtered out by the "dislike" filter. In this example, all channels except for the "tele-shopping" channel and pay channels 250 through 300 would be displayed. By pressing "9" on the remote control, the viewer could also choose to turn off the "dislike" filter so that all programming is displayed. Thus, both filters can be toggled on and off by hitting the appropriate number (8 or 9). Finally, the viewer exits from the personal programming guide by pressing the "exit" button 268 on the remote control 30.

While the invention has been described in its preferred embodiments, it is to be understood that the words which have been used are words of description, rather than limitation, and that changes may be made within the purview of the appended claims without departing from the true scope and spirit of the invention in its broader aspects.

For example, the personal programming guide can be extended in several directions. The cable controller may be linked to a more general personal computer. The general personal computer could run software that performs the personal programming guide procedures described herein and then downloads the results to the cable controller. A general personal computer could provide a smoother and more user-friendly interface using its keyboard, mouse, and CRT (Cathode Ray Tube) interface. The cable controller operations described herein could also be implemented within the television set itself, particularly since newer television models are already using microcontroller circuitry to perform various functions.

The personal programming guide may also extended to provide additional features. For example, a "suggested related programming" feature could be implemented. In this feature, the computer (cable controller or general computer) would look for programming that does not exactly match the "like" and "dislike" filters, but is closely related. For example, if a viewer likes a specific sports team, games between other teams in the same division as the viewer's team or a talk show program with one of the team's members might be included.

Another extension would be for the personal programming guide to have an extra built-in personal programming guide which represents an aggregation of all of the viewer-defined personal programming guides. This extra guide could be called a "family programming guide" and would include all programs that matched any of the personal programming guides updated automatically as each of the personal programming guides is updated. This would allow multiple viewers (e.g., a family) to view the personal programming guide at one time to determine which television program to watch.

Other general extensions could be added to simplify and facilitate the use of the cable controller viewer interface to the personal programming guide. For example, extra remote buttons, a customized personal programming guide display, and methods of zooming in and out of the personal programming guide display could be added.

What is claimed:

1. A programmable channel regulating cable television controller, comprising:

means for setting a time limit to be applied to the display of a cable television channel designated by a user and selected from a plurality of available cable television channels on a remotely located television set;

means for setting a time period during which said time limit is to be applied;

a channel timer for storing the amount of time available for display of said user designated cable television channel;

means for decrementing said channel timer in accordance with the amount of time said cable television channel is displayed;

means for disabling the display of said user designated cable television channel on said remotely located television set and for displaying a message for the viewer when said amount of time available for display reaches zero without disabling any other of said plurality of available cable television channels;

means for reininitializing said channel timer upon expiration of said time period; and means for simultaneous display of a channel number associated with said user designated cable television channel, said time limit and said time period on said remotely located television set.

2. A programmable channel regulating cable television controller according to claim 1 further comprising means to prevent unauthorized changes in said time limit, said time period and said user designated cable television channel.

3. A programmable channel regulating cable television controller according to claim 1, further comprising means for setting an activation time for said channel timer.

4. A programmable channel regulating cable television controller according to claim 1, further comprising means for displaying a message on said remotely located television set indicating that said time available for display has reached zero.

5. A programmable channel regulating cable television controller according to claim 1, wherein said time limit may be applied to a plurality of said available cable television channels.

6. A programmable channel regulating cable television controller according to claim 1, further comprising means for storing said amount of time available for display of said user designated cable television channel in a memory.

7. A programmable channel regulating cable television controller according to claim 1, further comprising means for displaying said time available for display on said remotely located television set.

8. A programmable channel regulating cable television controller according to claim 1 further comprising means for receiving cable television programming listings from a source of cable television programming listings, said cable television programming listings;

means for entering a plurality of keywords corresponding to a viewer's programming preferences;

a memory for storing said cable television programming listings, said plurality of keywords and said viewer's programming preferences;

means for matching said plurality of keywords with said cable television programming lightings to generate a redacted listing of cable television programming reflecting said viewer's programming preferences; and means for displaying said redacted listing on a television set.

9. A programmable channel regulating cable television controller according to claim 8, wherein said means for entering a plurality of keywords corresponding to a viewer's programming preferences further comprises means for sequencing through the alphabet to create said plurality of keywords.

* * * * *